April 4, 1939.  K. KLINGSPORN  2,152,807

ARRANGEMENT FOR LIGHT INTENSITY CONTROL

Filed Jan. 23, 1935    2 Sheets-Sheet 1

Inventor:

April 4, 1939.  K. KLINGSPORN  2,152,807

ARRANGEMENT FOR LIGHT INTENSITY CONTROL

Filed Jan. 23, 1935  2 Sheets-Sheet 2

Inventor:

Patented Apr. 4, 1939

2,152,807

UNITED STATES PATENT OFFICE 2,152,807

ARRANGEMENT FOR LIGHT INTENSITY CONTROL

Kurt Klingsporn, Berlin, Germany, assignor to Radioaktiengesellschaft D. S. Loewe, Berlin-Steglitz, Germany Application January 23, 1935, Serial No. 3,027
In Germany January 26, 1934

3 Claims. (Cl. 88—61)

Figure 2:
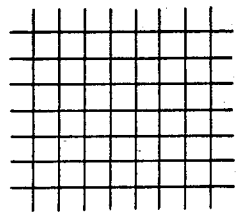
Figure 3:
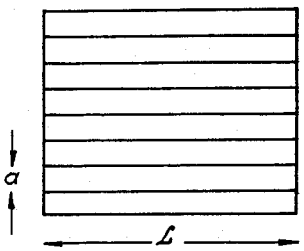
Figure 4:
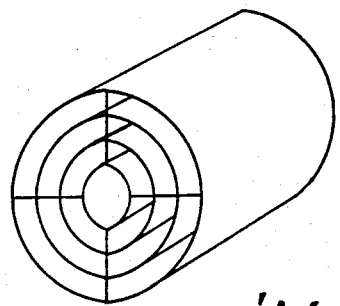
Figure 5:
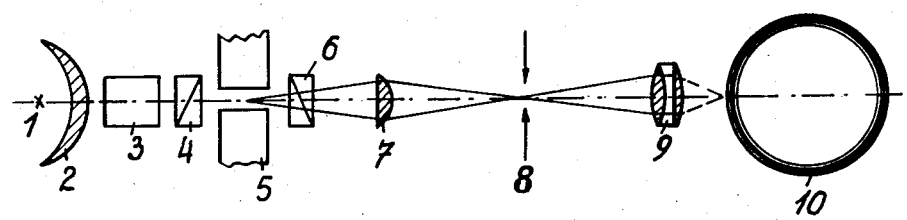

In the earlier development of devices for controlling the intensity of light, above all the Kerr cell and the piezo-electrical element, it was only possible to control small cross-sections of light amounting to very few mm.² Recent development of the art of piezo-electrical crystal optics, however, has provided the possibility of modulating in their intensities light bundles having cross sections in the order of at least 1 cm.² In this connection, however, new difficulties arise, which above all are due to the fact that the light bundles to be controlled in their intensities are not sufficiently homogeneous over their cross-sections to secure a clean control or even any noticeable control effect at all. This deficiency is overcome by the present invention, and a device is also set forth in which the greatest possible light output is ensured. The problem of completely modulating the intensities of light bundles having very large maximum intensities is of extreme importance in connection with television. An increase in the controllable intensity is possible by increasing the intensity per square unit of the light source. In this direction, however, the art appears at present to have been advanced to a state of saturation, from which it is hardly to be expected that substantial improvements are possible. In order, therefore, further to increase the light intensity, the size of the light source must be increased. From this results the following difficulty: If the light bundle is not very approximately parallel, the intensity modulation in the controlling member becomes uneven over the cross section, which may render the control entirely useless. Consider a light source disposed at the focal distance $f$ from a condenser lens system. This condenser lens system then produces a so-called telecentric bundle of rays. If the focal distance $f$ of the condenser lens system is small, the reproduction of the light source (which, in accordance with the foregoing, has a finite extension) will be infinitely large, i. e., rays are included in the bundle which slope to a comparatively large extent in relation to each other. If $f$ is large, this drawback is reduced, but the light intensity per square unit then drops in the condenser itself, as the latter is moved farther away from the light source, and besides the light absorption in the atmosphere is increased and the whole apparatus rendered unhandy. The present invention now provides for a parallelising arrangement in which a substantial parallelization of the bundle is achieved without such undesirable increase of the light path. According to the present invention there is provided in the passage of the rays a surface diaphragm formed by a plurality of surfaces each of which may be completely swept over by a straight line parallel to the optical axis of the total device if said straight line is one-dimensionally displaced parallel to itself, said surfaces forming at least one set in which every two of said surfaces have one uniform distance throughout, the distance between every two adjacent surfaces of one set being small, said surface diaphragm being located in the path of the light bundle and centered with respect to the optical axis of the total device to limit the maximum angle formed with the optical axis of the total device in planes parallel to said axis and perpendicular to said surfaces by the rays passing through said diaphragm. Such a surface diaphragm preferably consists of two groups arranged at right angles to each other of thin parallel plates all of which are disposed in parallel to the optical axis of the total device, but it may also consist of a system of co-axial cylinders the common axis of which coincides with the optical axis of the total device. Such plates or cylinders should be made as thin as possible, in order that they cover as little as possible of the cross-sectional area of the beam. The invention will be more fully understood from the appended drawings, Fig. 1 of which is a perspective view, Fig. 2 a cross-sectional view taken in the direction of the rays of light, and Fig. 3 an elevation of a preferred embodiment of a surface diaphragm, Fig. 4 showing a perspective view of a modified form of a surface diaphragm, Fig. 5 shows a complete light controlling device, and Fig. 6 a modified form of such a device, in which the path of light is twice deflected.

It will readily be seen (cf. Fig. 3) that by suitable selection of the length L of this diaphragm in the direction of the rays of light, and of the spacing $a$ of the individual surfaces from each other, it may be so arranged that merely that tilt of rays is admitted which does not produce disturbances in the intensity modulation, whilst all rays of greater inclination are shut out. According to a further feature of the invention the individual faces are made dull black, so that all impinging rays of light are fully absorbed, and not reflected. The bundle of rays emerging from this diaphragm does not include any rays of such inclination as to be capable of producing interfering figures, for example the well known crosses or circles, in the light-controlling member, e. g.

an electro-optically influenced crystal. In place of the set of flat surfaces situated at right angles to each other a cylindrical arrangement according to Fig. 4 may be employed, comprising cylindrical tubes of differently graduated diameters. The provision of the surface diaphragm renders it possible to utilise the entire cross-sectional light intensity from a source of finite extension, as set forth above.

Although the diaphragms provided according to the invention cause a slight deterioration of the effective optical aperture of the total optical device, there is nevertheless obtained the considerable advantage of proper control of the light intensity, which is absolutely essential in controlling cross-sections of large expanse. In order again to counteract the stated slight apparent deterioration in the effective optical aperture, the following optical arrangement shown in Fig. 5 is preferably employed.

Figure 1:
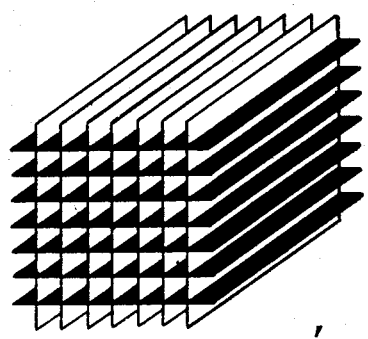

In Fig. 5 1 is a light source, 2 the condenser, 3 the aforesaid surface diaphragm, 4 the polarizer, 5 the Kerr cell or piezo-electric cell, 6 the analyzer, and 7 a cylinder lens, which contracts the square cross-section of the bundle of light in 5 to a gap form and projects the bundle thus contracted onto the aperture in a diaphragm 8. The ratio between the length and the width of the aperture in 8 corresponds to the prescribed proportion of the recording mark, e. g. the recording strip on a sound film. The lens 9 reproduces the gap in the diaphragm 8 on the film reel 10 on a correspondingly reduced scale. According now to the invention, the focal distance F of the cylinder lens 7 is selected to be of such extent that the bundle of rays passing through the gap in 8 is still so narrow at 9 that this latter lens is capable of embracing the total light, so that there is no further loss. The focal distance $F_0$ of the lens 9 is determined by the prescribed reduction of scale in the optical reproduction of the gap in 8, which gap preferably is not made too narrow, as otherwise diffractive effects occur. The optical aperture of the lens 9, and accordingly the admissible width of the bundle of rays, is technically limited. In this way the focal distance F of the cylinder lens 7 is determined. Since the cylinder lens 7 is required to just light properly the gap 8, the distance between the Kerr cell 5 and the cylinder lens 7 is accordingly also determined, and is to be made, in the case of a large focal distance, of a correspondingly large extent. This increase in spacing does not, however, result in any additional loss of light, apart from slight absorption losses in the atmosphere, as the light emerging from the control cell is substantially parallel, and accordingly it is almost immaterial where the lens 7 is situated.

Figure 6:
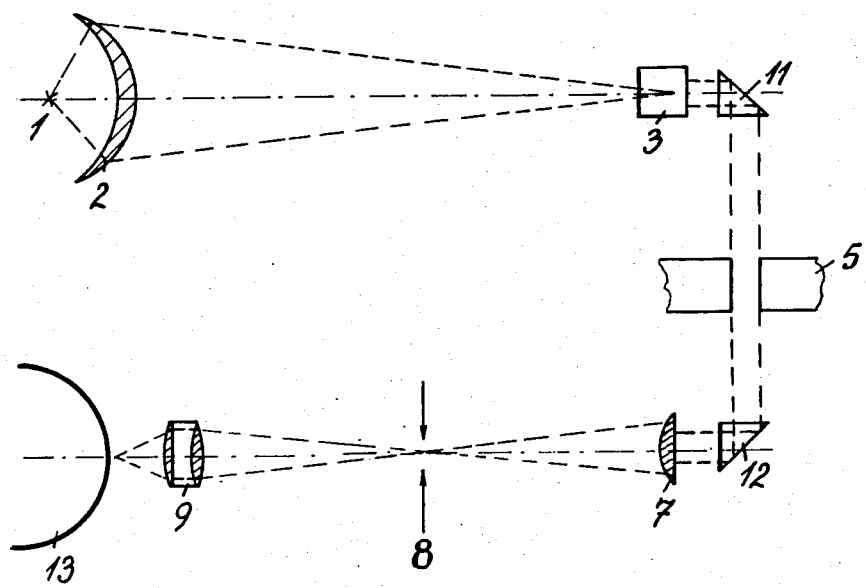

In order to prevent the dimensions of the arrangement from becoming too large, there may be employed according to the invention the device shown in Fig. 6, which contains two further improvements. Since upon the use of large focal distances the spacing between the light source 1 and the film reel 10 becomes very large, the path of light is deflected by equilateral rectangular prisms. Both in the case of the Kerr cell as well as the piezo-electric cells use is made, for intensity control purposes of the phase shift between ordinary and extraordinary light rays in the polarized light. Now it may be accomplished by proper selection of the material for the reflection prisms that these act simultaneously as polarizing and analyzing means, so that Nicol prisms may be dispensed with. For example according to the invention, lime spar may be employed as material for this purpose, the main axis being situated in the plane on which the light falls. In the arrangement shown in Fig. 6, 1 is again a light source, and 2 the condenser, which reproduces the light source 1 in the surface diaphragm 3. The focal distance $f$ of 2 is so chosen that the image just completely illuminates the surface diaphragm. 11 is the first refractive prism, which at the same time acts as a polarizer, 5 is again the Kerr cell, 7 a collecting lens, 8 a diaphragm, 9 a lens, and 13 for example a reflector wheel for television purposes, which naturally may also be replaced by any other image decomposing element, or by a film reel for sound film purposes. To the selection of the facal distances of 7 and 9 apply the remarks made in connection with Fig. 5.

It is obvious that in the arrangement of the individual elements various modifications are possible which may be of advantage for the particular purpose which the device is intended to serve. Thus, for example, the surface diaphragm may, in the case of crystal cells, be directly connected with the cell.

It is further possible, for example, to dispose the diaphragm 3 behind the polarizing means 4, or even behind the cell 5. The devices set forth in Figs. 5 and 6 are shown merely by way of example. By interchanging different elements without fundamental alterations of other kinds the optical conditions remain equivalent in principle.

I claim:

1. An arrangement for controlling the intensity of a large cross-section bundle of light comprising polarizing and analyzing means of the type in which complete polarization takes place located in the path of said bundle, a controlling element comprising a medium of controllable doubly refractive properties and an electrode system consisting of two equipotential structures, said controlling element being interposed in the path of said bundle between said polarizing and said analysing means to control the intensity of light allowed to pass through said analyzing means without appreciably varying the direction of light rays, and a surface diaphragm formed by a plurality of surfaces each of which may be completely swept over by a straight line parallel to the optical axis of the total device if said straight line is one-dimensionally displaced parallel to itself, said surfaces forming at least one set in which every two of said surfaces have one uniform distance throughout, the distance between every two adjacent surfaces of one set being small, said surface diaphragm being located in the path of said bundle and centered with respect to the optical axis of the total device in planes parallel to said axis and perpendicular to said surfaces by the rays passing through said diaphragm, a diaphragm having an aperture corresponding in shape to the luminous area to be finally produced, an optical reproducing system for producing an image of said aperture, and a condenser lens for reproducing the cross-section of said controlling element onto said aperture, said condenser lens having a very large focal distance to cause the divergence of the rays of said bundle passing through said aperture to remain so small that all of said rays are taken up by said optical reproducing system.

2. An arrangement for controlling the intensity of a large cross-section bundle of light comprising two prisms made of doubly refractive crystals and located in the path of said bundle to act as polarizing and analyzing means and at the same time as means for twice deflecting at right angles the path of said bundle, a controlling element comprising a medium of controllable doubly refractive properties and an electrode system consisting of two equi-potential structures, said controlling element being interposed in the path of said bundle between said polarizing and said analyzing means to control the intensity of light allowed to pass through said analyzing means without appreciably varying the direction of light rays, and a surface diaphragm, formed by a plurality of surfaces each of which may be completely swept over by a straight line parallel to the optical axis of the total device if said straight line is one-dimensionally displaced parallel to itself, said surfaces forming at least one set in which every two of said surfaces have one uniform distance throughout, the distance between every two adjacent surfaces of one set being small, said surface diaphragm being located in the path of said bundle and centered with respect to the optical axis of the total device to limit the maximum angle formed with the optical axis of the total device in planes parallel to said axis and perpendicular to said surfaces by the rays passing through said diaphragm, a diaphragm having an aperture corresponding in shape to the luminous area to be finally produced, an optical reproducing system for producing an image of said aperture, and a condenser lens for reproducing the cross-section of said controlling element onto said aperture, said condenser lens having a very large focal distance to cause the divergence of the rays of said bundle passing through said aperture to remain so small that all of said rays are taken up by said optical reproducing system.

3. An arrangement for controlling the intensity of a large cross-section bundle of light comprising two rectangular equilateral triangular prisms each cut from a crystal of a bi-refringent material in such manner that one of the smaller sides of the rectangular equilateral triangle in each prism is parallel to the optical axis of said crystal and the other smaller side is parallel to the secondary axis of said crystal, said crystal being so located in the path of said bundle that the first mentioned one of said smaller sides is vertical to the direction of said bundle and the second mentioned one of said smaller sides is parallel to the direction of said bundle, a controlling element comprising a medium of controllable doubly refractive properties and an electrode system consisting of two equi-potential structures, said controlling element being interposed in the path of said bundle between said polarizing and said analyzing means to control the intensity of light allowed to pass through said analyzing means without appreciably varying the direction of light rays and a surface diaphragm formed by a plurality of surfaces each of which may be completely swept over by a straight line parallel to the optical axis of the total device of said straight line is one-dimensionally displaced parallel to itself, said surfaces forming at least one set in which every two of said surfaces have one uniform distance throughout), the distance between every two adjacent surfaces of one set being small, said surface diaphrgam being located in the path of said bundle and centered with respect to the optical axis of the total device to limit the maximum angle formed with the optical axis of the total device in planes parallel to said axis and perpendicular to said surfaces by the rays passing through said diaphrgm, a diaphragm having an aperture corresponding in shape to the luminous area to be finally produced, an optical reproducing system for producing an image of said aperture, and a condenser lens for reproducing the cross-section of said controlling element onto said aperture, said condenser lens having a very large focal distance to cause the divergence of the rays of said bundle passing through said aperture to remain so small that all of said rays are taken up by said optical reproducing system.

KURT KLINGSPORN.